United States Patent
Kirk et al.

(10) Patent No.: US 7,650,227 B2
(45) Date of Patent: Jan. 19, 2010

(54) SYSTEM FOR USING CELLULAR PHONES AS TRAFFIC PROBES

(75) Inventors: Barrie Kirk, Kanata (CA); Keith Fagan, Kanata (CA)

(73) Assignee: Globis Data Inc., Kanata, Ontario (CA)

( * ) Notice: Subject to any disclaimer, the term of this patent is extended or adjusted under 35 U.S.C. 154(b) by 493 days.

(21) Appl. No.: 10/598,625

(22) PCT Filed: Mar. 17, 2005

(86) PCT No.: PCT/CA2005/000403

§ 371 (c)(1),
(2), (4) Date: Sep. 6, 2006

(87) PCT Pub. No.: WO2005/088578

PCT Pub. Date: Sep. 22, 2005

(65) Prior Publication Data

US 2007/0189181 A1  Aug. 16, 2007

Related U.S. Application Data

(60) Provisional application No. 60/553,541, filed on Mar. 17, 2004, provisional application No. 60/619,931, filed on Oct. 20, 2004.

(51) Int. Cl.
 *G08G 1/123* (2006.01)
 *G06F 19/00* (2006.01)
(52) U.S. Cl. .............. 701/117; 701/118; 370/252; 340/995.13
(58) Field of Classification Search ......... 701/117–119, 701/207, 213, 214, 216; 370/252, 260, 349; 455/456.1, 403; 340/995.13, 995.27, 905, 340/992
See application file for complete search history.

(56) References Cited

U.S. PATENT DOCUMENTS

| | | | | |
|---|---|---|---|---|
| 6,577,946 | B2 * | 6/2003 | Myr | 701/117 |
| 6,587,781 | B2 * | 7/2003 | Feldman et al. | 701/117 |
| 6,708,085 | B2 * | 3/2004 | Yamane et al. | 701/1 |
| 6,810,321 | B1 * | 10/2004 | Cook | 701/117 |
| 7,188,026 | B2 * | 3/2007 | Tzamaloukas | 701/200 |
| 7,228,224 | B1 * | 6/2007 | Rosen et al. | 701/117 |
| 7,269,507 | B2 * | 9/2007 | Cayford | 701/208 |
| 2003/0225668 | A1 * | 12/2003 | Goto et al. | 705/37 |
| 2004/0010368 | A1 * | 1/2004 | Scott | 701/213 |
| 2006/0122846 | A1 * | 6/2006 | Burr et al. | 705/1 |

FOREIGN PATENT DOCUMENTS

| | | | |
|---|---|---|---|
| CA | 2391605 | * | 6/2000 |
| CA | 2429659 | * | 6/2002 |
| WO | WO0225617 | * | 3/2002 |

* cited by examiner

*Primary Examiner*—Tan Q Nguyen
(74) *Attorney, Agent, or Firm*—Shin Hung; Borden Ladner Gervais LLP (57) ABSTRACT

A system and method for determining the flow of traffic in a monitored route segment using global positioning system, or assisted global positioning system, enabled cellular phones as traffic probes takes advantage of the existing cellular infrastructure to deploy traffic probes to determine the flow of traffic based on the speed and direction of probes. Filtering of probe data can be used to remove probes having outlying results such as excessive speed, or probes that do not fit the general trend already observed on a traffic route segment.

18 Claims, 4 Drawing Sheets

SYSTEM FOR USING CELLULAR PHONES AS TRAFFIC PROBES

CROSS REFERENCE TO RELATED APPLICATIONS

This application claims the benefit of priority of U.S. Provisional Patent Application No. 60/553,541 filed Mar. 17, 2004 and U.S. Provisional Patent Application No. 60/619,931 filed Oct. 20, 2004, both of which are expressly incorporated herein by reference.

FIELD OF THE INVENTION

The present invention relates generally to traffic flow monitoring. More particularly, the present invention relates to a system for traffic flow monitoring using either global positioning system (GPS) or assisted global positioning system (A-GPS) enabled cellular phones as traffic probes.

BACKGROUND OF THE INVENTION

Traffic flow monitoring makes use of traffic flow sensors to determine vehicle speeds on determined routes. These speeds allow a system to display traffic conditions to users. Based on the displayed information, drivers can decide upon a route that will aid in avoiding long periods of time stuck in traffic. Drivers are interested in information regarding the current speed of traffic along major routes, any congestion due to traffic volume, accidents or planned outages that might impair progress, and weather conditions. Traffic congestion in major cities is generally increasing, and there is strong interest, on the part of drivers, in receiving more detailed real-time traffic information. To satisfy these requirements, traffic information must be complete, accurate and timely.

Information that is not timely does not provide a driver with the ability to accurately choose a route. Information that is not complete may allow a driver to select a route that has several optimized segments, but can result in selecting a route with disruptions on other segments. Information that is not accurate does not provide a driver with the ability to properly select a route.

Providing timely and complete information requires that the system have access to real-time data with sufficient coverage. Real-time, or near-real-time, data allows the system to display current conditions. Although bad traffic conditions do not ease suddenly, traffic flow can be slowed to a near standstill quickly by a single accident. Incomplete coverage of major routes prevents users from obtaining access to the traffic flow information for those path segments.

To provide real-time complete data with accuracy requires both a deep coverage of the route with real time sensors, and proper algorithms to interpret the sensor information to account for both outlying conditions and regular patterns that can be confusing to sensors.

Traffic flow patters, once determined, can be disseminated to drivers in several ways such as by color-coding segments of a road map in accordance with the speed of the traffic flow; by delivering traffic conditions as audio using Interactive Voice Response (IVR) technology, by text messages transmitted to cellular phones, or by other such methods.

There are several known techniques for obtaining traffic flow information. Infrastructure based systems rely upon traffic sensors above and/or below the road surface including electromagnetic loop sensors ("loops") buried in the road surface. Loops provide information about the density and speed of vehicles passing over each sensor. Though loops and other infrastructure traffic flow monitoring systems can provide reliable data, they are expensive to deploy and operate and their installation is disruptive to traffic flow. Many government transportation agencies do not have the budget to install or expand this type of sensor network. Cameras have been deployed to provide television viewers and Internet users with the ability to watch segments of traffic. From these camera images slowdowns and congestion can be observed. However, the coverage provided by these systems is poor at night and in bad weather. Furthermore, automated systems have difficulty making use of cameras as inputs as complex pattern recognition is required to determine traffic conditions without an operating intervention. As a result camera based systems are commonly used as an adjunct to existing systems.

Many traffic routes, especially toll-based routes, are traversed by vehicles making use of transponders. These transponders communicate vehicle entry and exit time and location information to toll administrators. Each transponder uniquely identifies a vehicle, so that proper accounting can be performed. As a result, the route administrator has the ability to determine the speed of any vehicle using a transponder. This information can then be used to determine traffic flow. There are three drawbacks to using this type of system to measure traffic speeds. First, there are no standards for communicating with transponders, as the transponders are typically custom designed for each toll road. The technology is therefore not easily transportable to different markets. Second, if only entrance and exit locations and time are obtained, it is complex to provide zone-based data, as the information will be initially presented as overlapping zones. If a driver uses the toll road for 10 exits, and there is a distinct slow down at a particular point, it is difficult to correlate the increased travel time to a particular segment. This problem is less acute as more vehicles are monitored, as there will be a number of vehicles with different entry and exit points, that experience different average speeds as a result of congestion or an accident on a particular segment. From a large number of vehicles, sufficient data can be obtained to determine segmented data, but these calculations are complex, and scalability becomes an issue as more vehicles are added to the system. Third, transponder based system may work on toll-roads, but without a receiver infrastructure in place, traffic flow monitoring cannot be performed for other roads. Installing and operating this infrastructure on non-toll roads is expensive.

Infrastructure based systems requires expansion of existing in-road or transponder networks. Neither approach is commonly viewed as feasible as it entails a high initial cost that is typically borne by a government. As a result, there is a requirement for non-infrastructure based traffic flow systems.

Attempts have been made to introduce traffic probes into vehicles, so that as the vehicle travels over a route, a signal is relayed to a traffic flow monitoring network. By having vehicles acting as probes, vehicle speeds can be calculated in different zones allowing for a simpler calculation to be used to determine traffic flow. Traffic probes are best used in large quantities, as it allows for better aggregate data. Cell-Loc, of Calgary AB CANADA, has developed a system for measuring traffic speeds using Time Difference of Arrival (TDOA) data based on cellular phones interacting with the cellular network. When a cellular phone interacts with more than one cellular tower, the time difference between the signal arriving at the multiple towers can be used, in conjunction with the known location of the towers, to determine the location of the cellular phone. TDOA is computationally difficult, must be implemented in the cellular network, and is expensive to deploy. Many cellular providers are not implementing this location technology, and as a result, an insufficient number of probes can be deployed.

Applied Generics of Scotland has developed a solution using a particular attribute of the GSM-based cellular networks, where a cellular phone can determine signal strength from a number of adjacent cellular stations. Performing a location determination using this technique requires a detailed map of the cellular station placement, and must either be done in the phone, or the signal strength data must be uploaded to the network for processing. Storing a map in the phone is impractical for most situations, as the detail of the map would pose a computational problem for most cellular phones. Uploading the data to the network requires activation of a data link between the phone and the network, which increases network traffic and is often considered to be undesirable by the network operator. Computing a location using this system is iterative, and is thus computationally intensive. There is a steep trade-off between accuracy of the location and the computational complexity of the calculation. As the network must do this calculation, scaling to a large number of probes is infeasible.

Decell Technologies Ltd. in Israel provides a service using technology based solely on the existing mobile network infrastructure. Decell enables mobile network operators to deliver personalized real-time route guidance to driving mobile subscribers. Their technology uses existing cell towers along major routes and uses the GSM capability of relative signal strengths to determine a user's position between towers. The service then uses traditional cell phone delivery mechanisms to provide traffic status information about the driver's route. Once again, the implementation of this system requires a number of highly complex calculations based on a plurality of tower strengths, and encounters scalability issues for large numbers of probes. Furthermore, the system does not allow interaction between a plurality of carriers, and as such limits the number of probes to the users of a single carrier. Though this is not an issue in certain markets that have a dominant wireless carrier, in markets where a number of carriers have substantial market share, it greatly reduces the number of available probes.

Many other techniques making use of characteristics of cellular phones as they move through a network have been attempted. Numerous problems in location calculation complexity and accuracy have been experienced. Additionally, many of these systems require that the cellular device maintain an active data connection to the network, or at least periodically create a data connection to send the information. These techniques are infeasible as the number of probes scale due to both computational complexity and network resource usage.

Within the ITS Orange Book on Predictive Travel Time, there is a clear recognition that travel predictions and forecasts rest on the ability to also capture the current travel conditions. However, none of the projects identified by the Orange Book have solved the problem of distributing low cost traffic probes that can interact with a traffic flow monitoring system in a fashion that can scale for large numbers of probes in a cost-effective fashion. It is, therefore, desirable to provide a system and method for using traffic probes to accurately determine traffic flow in a route segment.

SUMMARY OF THE INVENTION

It is an object of the present invention to obviate or mitigate at least one disadvantage of previous traffic flow monitoring systems.

In a first aspect of the present invention, there is provided a method of determining the flow of traffic on a monitored route segment. The method comprises obtaining and storing location information for a plurality of global positioning system enabled cellular traffic probes; determining the speed of each of the plurality of probes based on the stored location; selecting a subset of the plurality of probes corresponding to probes having a location in the monitored route segment; and determining the traffic flow for the monitored route segment on the basis of the determined speed of the probes in the selected subset.

In an embodiment of the first aspect of the present invention, the step of determining the speed includes determining the speed of each of the plurality of probes based on the stored location and historical data. In another embodiment, the step of obtaining and storing includes obtaining and storing location information for a plurality of assisted global positioning system enabled cellular traffic probes. In a further embodiment, the step of obtaining includes requesting location information from a location based service platform optionally over a virtual private network to a cellular carrier location based service platform. In other embodiments, the step of storing the location information includes storing a probe identifier, a timestamp and a probe location in a database. The step of determining the speed can include determining a distance traveled by each probe having a database entry with the most recent timestamp since the previous timestamp, and dividing the determined distance by the time between timestamps. In another embodiment, the step of determining the speed includes obtaining a velocity vector from the location information. In another embodiment, the step of determining the speed includes determining a direction of travel for each probe having a database entry by comparing the most recently stored location to the previously stored location, and the step of selecting a subset includes selecting all probe locations in a defined area having a defined determined direction of travel. In another embodiment, the step of selecting a subset includes selecting all probe locations in a defined area. In a further embodiment, the step of determining the traffic flow includes grading the traffic flow in accordance with the speed of the selected subset of probes. In yet another embodiment, the method further includes filtering the selected subset to remove outlying probe values prior to the step of determining the traffic flow, wherein the filtering includes either determining a distribution of the probes in the subset, and removing from the subset any probe having speed more than two standard deviations from the normal of the distribution or determining an average speed of the probes in the subset, and removing from the subset any probe having a speed more than a predetermined amount away from the determined average speed.

In a second aspect of the present invention, there is provided a system for monitoring and determining the flow of traffic on a monitored route segment. The system comprises a location fetcher, a location processor and a mapping engine. The location fetcher obtains and stores location information for a plurality of global positioning system enabled cellular traffic probes. The location processor determines the speed of each of the plurality of probes. The mapping engine selects a subset of the plurality of probes corresponding to probes having a location in the monitored route segment and determines a traffic flow rating on the basis of the determined speed of the probes in the selected subset.

In embodiments of the second aspect of the present invention, the location information includes position and velocity vectors. In other embodiments, the location fetcher includes a location based service platform interface for connecting to a location based service platform to request and receive location information for a plurality of assisted global positioning system enabled cellular traffic probes. In a further embodiment, the mapping engine includes a filter for selecting a subset of the plurality of probes corresponding to probes having a location in the monitored route segment, a speed within a ranged determined in accordance with the speed of other probes in the subset, and a predetermined direction.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for monitoring and managing traffic flow and congestion using GPS enabled or Assisted-GPS enabled cellular phones as traffic probes. A-GPS enabled cellular phones are used throughout the following description, but one skilled in the art will appreciate that GPS enabled cellular phones could also be used without departing from the scope of the present invention. A-GPS is a presently preferred embodiment due to its wider deployment than GPS enabled phones As discussed above, to obviate the need for expensive infrastructure based traffic flow monitoring systems, probes can be deployed into the traffic flow and then monitored. This allows for resizing zones where appropriate, and if the data is timely, complete and accurate allows for data to be presented to drivers to assist in the selection of proper routes.

To obtain accurate and complete data using traffic probes, it is advantageous to make use of a large number of probes. Cellular phones are widely used and distributed, and provide an ideal probe if their position can be computed accurately and without a high degree of complexity. As implemented in prior art solutions, the use of cellular phones as probes requires a cellular network component to determine the position of the probe. Though prior art solutions have attempted to use triangulation and/or trilateration techniques based on either time of arrival of signals, or based on the strength of a signal received by the handset, these techniques are relatively inaccurate and typically do not offer sufficient resolution to allow for differentiation between adjacent roads. In addition, these network-based solutions generally need a minimum of two cell-towers for triangulation and/or trilateration techniques to be used. Many sections of highways and roads on inter-city routes often have coverage from only one cellular tower. The lack of clear access to additional towers degrades the positional accuracy provided. In such cases, the positional accuracy is limited to specifying coverage area of a cell-tower—which can be several kilometres or more.

To simplify the location determination, the present invention makes use of cellular phones that include GPS, or assisted GPS (A-GPS), technology. A-GPS-enabled cellular phones have been introduced so that carriers can comply with legislation and consumer demand for enhanced emergency call service. Emergency call services, such as Enhanced 911 (E-911) calling, require that the network be able to provide a phone location to emergency services. While this was simple with landline phones, mobile phones provided a greater problem. A-GPS-enabled cellular phones can provide location information to the network based on received signals from the constellation of GPS satellites. If the cellular phone does not have the computational power to quickly process a location, the signals can be provided to the network, for simple determination of a location. The network is able to determine the location of an A-GPS cellular phone on the basis of the satellite signals that the phone received, and the signal strength of towers that the phone can identify. The combination of these data, allows for an immediate coarse location to be determined based on the network information, such as tower signal strengths, and then allows the location to be refined using the satellite signals. Dedicated hardware in the network to perform computations, such as fast Fourier transforms (FFT), greatly reduces the complexity of location determination.

Some cellular networks already support the location determination, and are beginning to offer a number of location based services to users. The location information is generally obtained by the location server based on a request from a 911 response centre or a commercial location based application. This data can be provided by the network to an outside entity, such as a traffic flow monitoring system, in an anonymized fashion, so that privacy is protected. By making use of the large number of A-GPS handsets in use, a sufficiently large number of traffic probes can be deployed with a low setup cost as the infrastructure is already in place.

Access to a cellular network's location based server commonly uses the Mobile Location Protocol (MLP) version developed by the Location Interoperability Forum (LIF). LIF's MLP is XML based, allowing for a standardized method of querying the network for the location of the mobile traffic probes.

Figure 1:
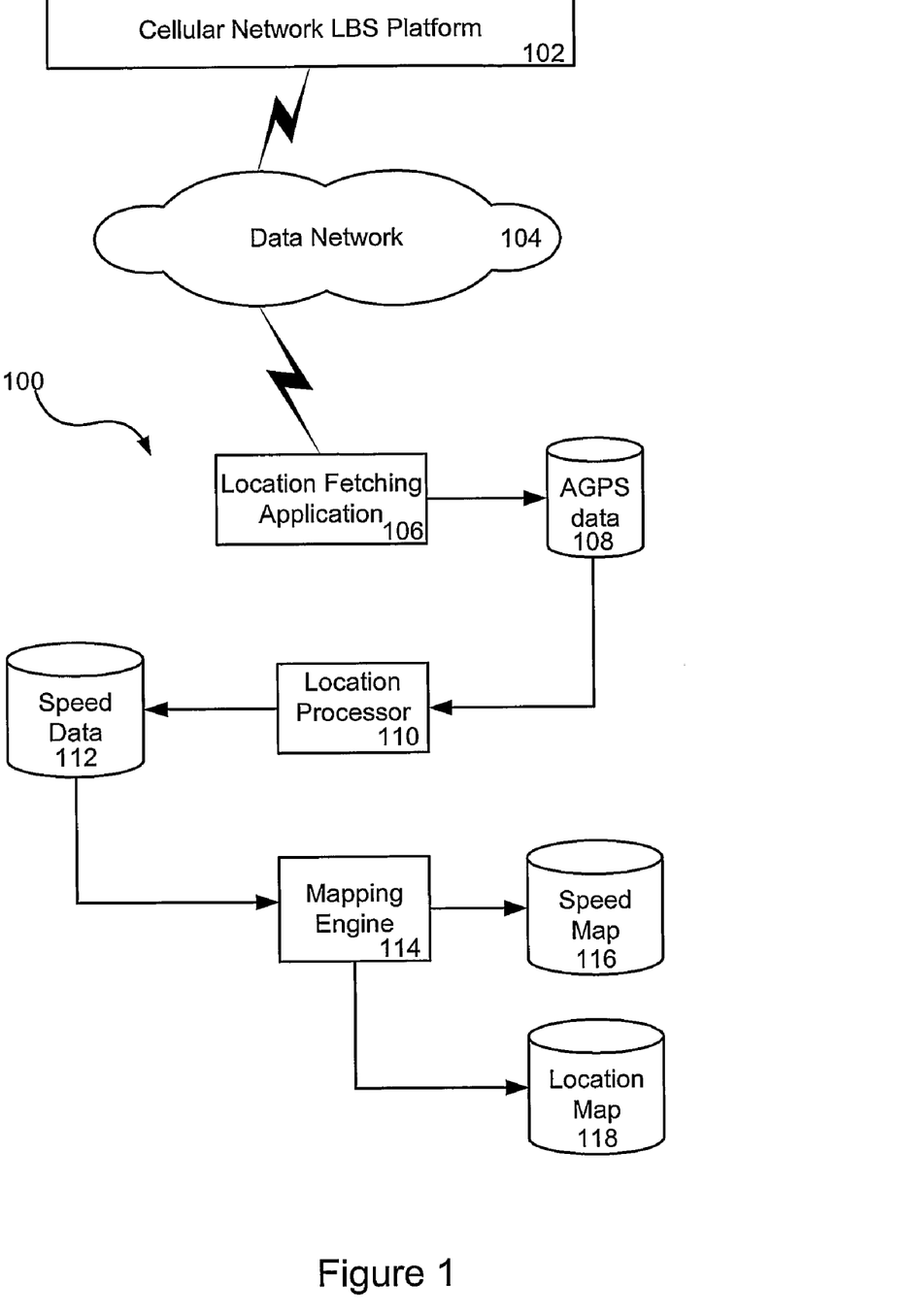
FIG. 1 is a block diagram illustrating a system of the present invention.

FIG. 1 illustrates a system 100 of the present invention. A cellular network LBS platform 102 obtains the location information for a plurality of subscriber cellular phones. These the location information is then queried by the location fetching application 106 through a data connection over data network 104. Data network 104 can be any packet switched network, such as the Internet. For privacy and security reasons, if data network 104 is a public access data network, such as the Internet, a virtual private network (VPN) is preferably established to allow for a secure data connection. Location fetching application 106 obtains trackable location information from the LBS platform 102 that is preferably anonymized. To allow this, LBS platform 102 preferably assigns an unidentified tracking number to each device that it can track. The tracking numbers can be reused on different segments, or they can be changed at fixed time intervals to protect subscriber anonymity. Location fetching engine 106 populates a local A-GPS database 108 with time stamped location entries. The time stamp of the entry is preferably obtained from the LBS platform, so that both a position and a time are known. This database 108 can be used to create historical trends of location, to allow for speeds to be computed. The number of historical entries supported in the database is determined by storage facilities and the need for old data for processes such as filtering.

Location processor 110 accesses the data in A-GPS database 108 and filters the data to obtain information of interest. The filtering process examines the location of probes, and disqualifies probes not in areas of interest. Thus, phones in office buildings and homes are not used and are removed by the filtering process. This can be done with a process known as geofencing. The geofenced data is slotted into monitored travel routes. The speed is then computed in either of two ways. If the A-GPS system supports it, the velocity vector can be transmitted with the position data. If the velocity vector is not available, a comparison of the location of the geofenced probes to a previous position is made. This comparison allows for a distance travelled over a fixed time to be computed. Based on the computed speed, and the historical data for a probe, a speed value can be stored into speed database 112. On the basis of the speed data stored in database 112, traffic flow conditions can be determined. Average travelling speed in a route segment can easily be determined by querying the database 112 for all probes travelling in a defined segment, and performing an averaging operation on the values. Mapping engine 114 can use this information to populate speed and location mapping databases 116 and 118 respectively. Standard presentation interfaces can be used to access speed and location mapping databases 116 and 118 to render this information in an easy to digest format, such as a map with color coded routes.

A number of factors must be considered in the filtering process. When a probe location is obtained, it may not fit directly inside a route segment. Probes that are sufficiently close to the route segment may be outside the segment due to inherent inaccuracy of the location information. As such, route segments preferably have buffers to allow them to include all relevant probes. On arterial roads, this will result in overlapping route segments for the different directions of traffic. Thus, a probe that appears to be travelling eastbound in a westbound route segment is likely placed in that segment due to a location error. By observing the past positions of a probe, it is possible to refine the geofencing, by requiring that a probe appear as going in a direction for a fixed number of time intervals before it is able to transfer between parallel segments. When a probe is between two perpendicular segments, a weighted combination of its past direction, and closest segment can be used to determine which segment the probe is in. In a presently preferred embodiment, geofencing of the probes minimizes the missed distance between a probe a route segment, so that probes are preferably assigned to the segment closest to them that accords with their historical travel direction.

The speed of a probe is also important in the population of the speed database 112. On arterial routes, pedestrians equipped with cellular phones must be filtered out, as should abnormally slow or stopped vehicles on highway routes. A car that is stopped on a highway may simply indicate that the driver had to pull to the side, and should not have an effect on the computed segment speed. When a sufficient number of probes are used, a speed distribution will typically have a normal distribution, or a pseudo-normal distribution. Outlying probe speed values can be filtered out to avoid inclusion of odd results. Thus, a car that is stalled at the side or the road, or a pedestrian travelling at a speed considerably slower than arterial traffic, will be excluded from the speed database 112. On arterial roads, the distribution may include two peaks, one corresponding to pedestrian traffic, and one corresponding to vehicle traffic. Using an analysis of adjacent route segments, one of the two peaks can be discarded, to avoid inclusion of the pedestrian traffic.

Each element in the system 100 of FIG. 1 is preferably designed to be as close to a stand-alone element as possible. This allows for redundancy and re-use of existing components in the network and provide maximum flexibility. There is no preference or limitations in how code is written or the language in which it is coded other than a preference that a high quality index was to be maintained, and that adequate management techniques are incorporated to allow for code maintainability and adjustments to certain parameters as needed. The stand-alone nature of the elements allows for evaluation of each module's operation and characteristics before passing the processed data to the next stage. Additionally, enhancements can be made to a single module without the surrounding modules requiring any change in their design or operation.

The location fetching application 106 preferably requests and retrieves the cell-phone A-GPS data on a flexible schedule and places the results in A-GPS database 108 that can be accessed and archived by the other elements of system 100. Use of the standard MLP commands allow for request to be issued by fetching application 106 to the LBS Platform 102 to obtain information based on a probe identification number, as well as to set the pinging frequency and establish an accuracy requirement. This allows the location fetching application to only request information about probes that have an accurately determined position. In response to the requests of the LBS platform 102, location fetching application 106 receives XML location data and LBS error messages. The error messages can be used to determine how robust the received data is, as a large number of error messages in a particular segment may indicate that there is a network error causing inaccuracy in the location determination. Based on the responses the location fetching application can populate A-GPS database 108 with A-GPS log entries. When the location fetching application 106 connects to LBS platform 102 it can either obtain bulk data for a large number of unidentified cellular phones and then begin to process the location information, or it can request the position information of a set of subscribers. Though both of the above can be performed, it is presently preferred that the location fetching application 106 requests information about a set of subscribers for privacy related issues, though one skilled in the art will appreciate that systems and methods of the present invention can make use of either scenario. To build a historical data set, the location fetching application 106 can request and store location data from the probes at fixed intervals. Location fetching application 106 issues a location request to LBS platform 102 specifying a set of probes that the information is requested for. LBS platform 102 then determines the cellular sector that the probe is located in. This first rough location can be used to determine the GPS satellites that the probe should have access to, and should obtain signals from. The LBS platform 102 then issues a request to a probe for GPS satellite information from specific satellites. The cellular phone probe, upon receipt of the system request, transmits the satellite information to LBS platform 102. LBS platform 102 then determines location information for the cellular probe based on the known cell position and the GPS satellite data. The position information includes the location of the probe and, if supported, can also include velocity data indicating both speed and direction. The position information is then forwarded to the location fetching application 106. The back end processing used to determine the location of the probe could be performed in any number of manners, including the one described above, without departing from the scope of the present invention.

The Location processor 110 accesses A-GPS database 108 and applies appropriate filters to verify the utility of the data in advance of further processing. The data is then converted into a standard structure that facilitates further processing. The verification filters eliminate outlying cases to provide a more accurate data source, and provide the geofencing required for later mapping. The location engine 110 applies both geofencing and georeferencing to the data and develops the probe location data file while at the same time developing the average speed for the segment of road based on predetermined instructions. The probe location data file can be stored in either A-GPS database 108 or it can be stored with the speed values in speed database 112.

The algorithms preferably select (or discard) data that is outside a predetermined set of criteria and identify the road segment the data applies to. The A-GPS positional information uses the regular constellation of GPS satellites. However, cellular phones are not always in optimal locations to be able to see the necessary numbers of satellites to provide the best possible resolution. The data is therefore supplemented by positional data obtained from triangulation based on the cell-phones' strongest signal. The result is that there is an uncertainty of position. This uncertainty is used in two ways:

First, location data with a radius of uncertainty greater than a predefined threshold is preferably filtered out and not used. This threshold can be adjusted, and set to a value that is best determined during calibration trials when only a limited number of cell-phones are used on the network. The value can be later adjusted as the number of probes increases to select only probes with a small radius of uncertainty. A balance can be achieved between the data points to be included and those to be discarded due to their creating erroneous readings on the speed calculations.

The second part of the filtering deals with allocating data points to the correct road segments. The presently preferred method uses a classical orthogonal approach whereby the location of a probe is allocated to a road segment and a place on the segment that is closest to the cell-phone probe. The vector from the cell-phone to the closest road segment and the road segment itself meet at a right angle, which serves to minimize the missed distance between the probe and the road. In cases where the missed distance between a probe and a road results in an ambiguity (e.g. two road segments intersect, and the probe is an equal distance from both segments) then other algorithms can be used to resolve this ambiguity through the analysis of the previous data.

The mapping engine 114 determines on the basis of the position of the probes in the speed database 112, how to map the speeds for different segments. The filtering described above for location processor 110 can optionally be split between these two elements, as mapping engine 114 may have better ability to perform geofencing and georeferencing. The mapping engine 114 then generates speed maps in database 116 and location maps in database 118. The data in these two databases can be accessed by any number of front ends for formatting for different distribution media. Examples of distribution channels include color-coded maps for websites, digital audio broadcast (DAB) of the real-time maps, an interactive voice response (IVR) system, and an text messaging engine to send SMS messages either in response to an SMS request or a predefined time schedule.

The system of the present invention will typically be used to monitor the traffic flow of both highways and arterial roads, some of which have traffic lights. When a car stops at a traffic signal, the resulting velocity vectors are indeterminate, and the system can become "confused" as to which direction the car is traveling in. In conjunction with the uncertainty of the car position, the system may have a tendency to categorize the route segment as grid locked, stopped, in both directions. This problem can be addressed by using a historical record showing the past direction for each vehicle. It can be assumed that a vehicle that was traveling in a given direction, such as east, if it stops, will continue traveling east. Its direction can be monitored, and it will not be counted as a vehicle in the westbound lanes, unless a predetermined number of samples show it as having a westbound direction. This allows vehicles to turn around and still be counted, but stops eastbound probes from stopping and being seen as in the westbound lanes.

Routes are preferably divided into segments or zones, so that each segment can show a different traffic flow, it is possible that some zone boundaries will be close enough to each other that it was possible for a vehicle moving at the posted speed to completely traverse a zone before its position is updated. A zone extrapolation filter can be employed to recognize that a probe has bypassed a zone connecting two other zones, and is thus likely an uncongested route segment. As the number of probes in a system is increased, the probably of this result diminishes.

An exemplary system of the present invention has been tested for both highway and arterial traffic monitoring, with the results used to color-code a map. In the following discussion, red, yellow and green are used to designate slow to stopped, intermediate speed, and full speed segments. Stoplights on arterial roads generated red zones on the map because sequential pings indicate that the vehicle is stopped. While this is correct in one sense because the vehicle is actually stopped, it may not indicate that traffic flow is red. The stopped vehicles are part of the normal flow of traffic on arterial roads. An averaging process making use of historical data is preferably employed to reduce the number of red zones attributable to stop lights.

Pinging cell phones for location information, while they are entering or leaving a limited access highway can also result in false red or yellow results, due to inherent slowdowns associated with slower traffic coming up to highway speeds and merging with highway traffic. As the number of probes in the system is increased the existing algorithms will eliminate these results by averaging the merging traffic results with the traffic results of probes already traveling on the highway. The higher speed of the highway traffic will set an average speed sufficiently high to allow exclusion of the inbound traffic.

In testing, highway results were isolated and analyzed separately. Generally the results are slightly better than on arterials. A review of the results shows that some of the calculated result errors are attributable to the averaging of speed results from the arterial roads at the highway exit points. For example, incorrect red map segments may be attributable to vehicles being stopped for a red light just before the entrance to a highway. As indicated above, as the number of probes in the system increases, the averaging of the results will reduce the effect of such a situation.

In use, the exemplary system of the present invention consistently paints a map green, yellow, and red even when a small number of cell phones are being pinged. Due to the limited number of probes the results on arterial roads may have inaccuracies due to the over-reporting of red results and possible observation bias to report after acceleration to normal speed.

Calibration of A-GPS results to a known station marker prior to deployment of the system is presently preferred. This allows the filtering process to account for A-GPS inconsistency, and allows for a refined geofencing and georeferencing operation. It is also presently preferred that several different A-GPS probes be used, with at least one probe from each network. Differences in handsets can also be compensated for if sufficient testing is performed, and handset information is requested from the LBS platform 102. This will give an uncertainty value for each carrier network, and preferably for each phone type. The calibration can also be done using a number of known station markers, and a drifting positional uncertainty can be used. For the testing, a Natural Resources Canada (NRCAN) station marker was selected. The position of this marker is known to within ±1 millimetre in both a northing and easting position. Four phones were set up directly on top of the marker and 250 data points were collected. The resulting positions (Latitude and Longitude) were logged by the system and the results were subjected to further analysis. Using known spherical geometry calculations, the apparent distances between the cell-phones and the reference station marker were calculated.

It should be noted that the horizontal datum used for the reference position used the NAD83CSRS standard, whereas the reference used for the A-GPS positions is the WAC84 standard. A comparison of these two standards showed that the introduced error is zero meters for the Longitudinal positions, and less than 0.0001 meters (at a Latitude of 45 degrees) for the Latitudinal. This level of error is considered to be acceptable for the purposes of conventional traffic flow monitoring.

Figure 2:
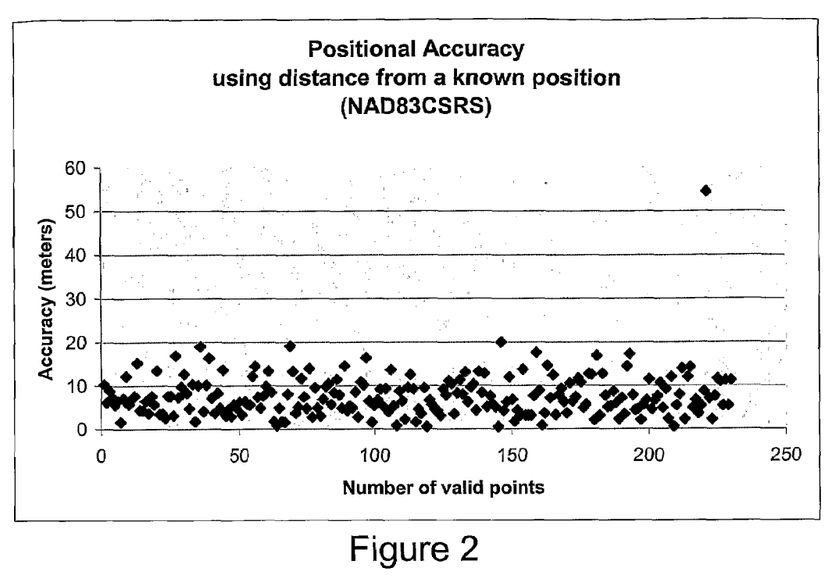
FIG. 2 is a scatter plot generated during testing of an exemplary system of the present invention.

As can be seen from the FIG. 2, the average inaccuracy was approximately 7 meters and over 99% of the results had accuracy better than 20 meters. The consistent accuracy of better than 20 meters is very acceptable for using cell-phones as traffic probes. It should mean that adjacent roads not closer than approximately 30 meters apart can readily be discriminated and therefore presented in a graphical mapping format.

To determine the accuracy of the "raw" speed data from the software testing against known results can be performed. The "raw" speed is defined as the actual speed in Km/hr as determined by the software and prior to the application of algorithms. The approach to this part of the testing was as follows:
   Calibrate the speedometers on the two cars used for this test, based on the time to travel a route measuring exactly 4.55 Km. A speedometer adjustment formula was developed for each vehicle and this formula was applied to all speedometer readings.
   Drive along a highway at a constant speed and record:
      a precise time that can be correlated
      a speedometer reading, and
      the speed as determined by the software (this speed was automatically logged by the software with a date and time stamp)
   Repeat the second step for various speeds.

Figure 3:
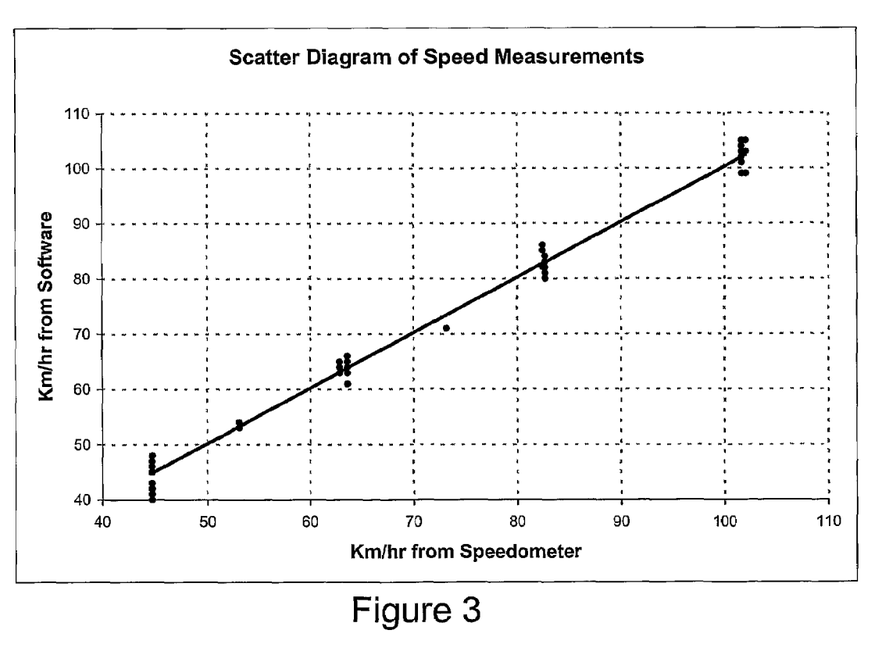
FIG. 3 is a scatter plot illustrating the speed determined during testing of an exemplary system of the present invention.

FIG. 3 illustrates a scatter plot of 51 data points obtained using the testing outlined above. These were used as source data for a scatter diagram that shows the relationship between the two sources for the speed data.

Figure 4:
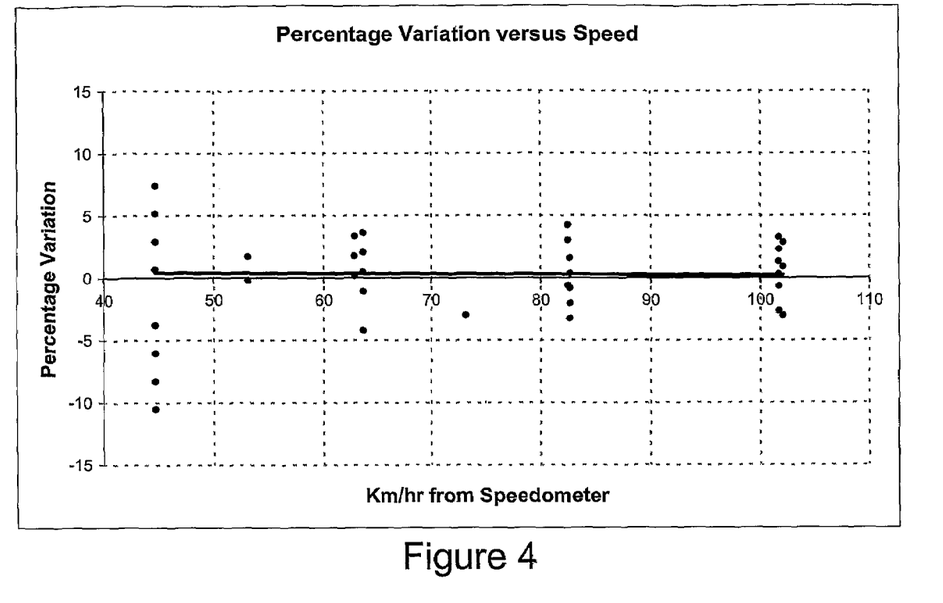
FIG. 4 is a plot illustrating the variation in speed caused by positional inaccuracy of probes in an exemplary system of the present invention.

Note that the parameter "Km/hr from Speedometer" incorporates the adjustment factor resulting from speedometer calibrations. To further investigate the variation between the two sources of speed data, a second scatter diagram was developed showing the percentage variation at various speeds. FIG. 4 illustrates the following:
   The average of all errors across all speeds is consistently less than 1%.
   The range of data points at just over 100 Km/hr is from +3.2% to −3.0% relative to the corrected speedometer readings.
   The range of data points 45 Km/hr is from +7.4% to −10.5% relative to the corrected speedometer readings.

The above-described accuracy is sufficient for determining the speed of traffic, especially when the algorithms incorporate an averaging function. FIG. 4 also shows that at lower speeds, the spread between the data points increases. The explanation for this increased spread is as follows:
   At 45 Km/hr, as mentioned above, the calculated speeds range from +7.4% to −10.5% relative to the corrected speedometer reading.
   At 45 Km/hr, a car travels 375 metres every 30 seconds (the interval used for pinging the LBS).
   The positional accuracy tests described above show that the worst-case positional error for over 99% of the data points is 20 metres (although the mean error was 7 metres).
   In a true worse case situation, each of the locations reported by a pair of pings is off by the maximum error in opposite directions. In the tested configuration, the maximum error in the distance travelled would be 40 metres.
   The worst-case percentage error in distance travelled is therefore 40×100/375, i.e. 10.7%.
   This means that in the same worst-case situation, the calculated speed would also be out by 10.7%. This theoretical value is very close to 10.5%, the worst measured error at 45 Km/hr.

As a result, at lower speeds, the distance travelled between pings is less and the impact of the positional inaccuracy is greater. Increasing the time between pings would, of course, increase the distance travelled and reduce this effect, but there are trade-offs with other factors. These errors were noticeable in the exemplary system due to the limited number of probes. As noted above, probe based systems benefit from the use of large numbers of probes, a situation that can be achieved through use of the large number of GPS-enabled cellular phones carried by drivers.

In testing of the exemplary system, with only a small number of traffic probes, indicates that the average of the errors at all speeds is consistently less than 1%, and that the range of the error in the data points varies from +3.2% to −3.0% at just over 100 Km/hr, to +7.4% to −10.5% at 45 Km/hr. This range of errors is sufficiently accurate enough for determining the speed of traffic.

An extended portion of a Highway was defined for a highway-only test. The zones for this test were set to be somewhat larger than the zones for the previous test to allow for more pings to the same cell phone probe while within a single zone to avoid the missed zone problem described above. Reporting points for observation and odometer readings were predefined to ensure more consistent measurement and small observation intervals eliminated to reduce the potential impact of small distance errors creating large speed calculation errors. The first test consisted largely of normal traffic with few reductions of speed. The second test was held in peak time with more yellow and red reported.

Results for this test yielded only 1 yellow result that was user-observed as green. The results are actually better than they appear. The map colour changed consistently approximately 40 seconds after a report of an observed traffic speed change. Especially at slower speeds, this sometimes resulted in changes in the map color while the test vehicle was in the zone. This was confirmed by observation. The one yellow result observed as green also had a brief period of time as yellow. There were a number of other occasions where the map briefly changed a zone from green to yellow and then back. This was also confirmed by observation.

The tests confirm that the system of the present invention can perform with a limited number of probes and still provide accurate results. With the addition of more probes to the system, the accuracy of the system will further increase, and exceptional cases will be averaged out.

Figure 5:
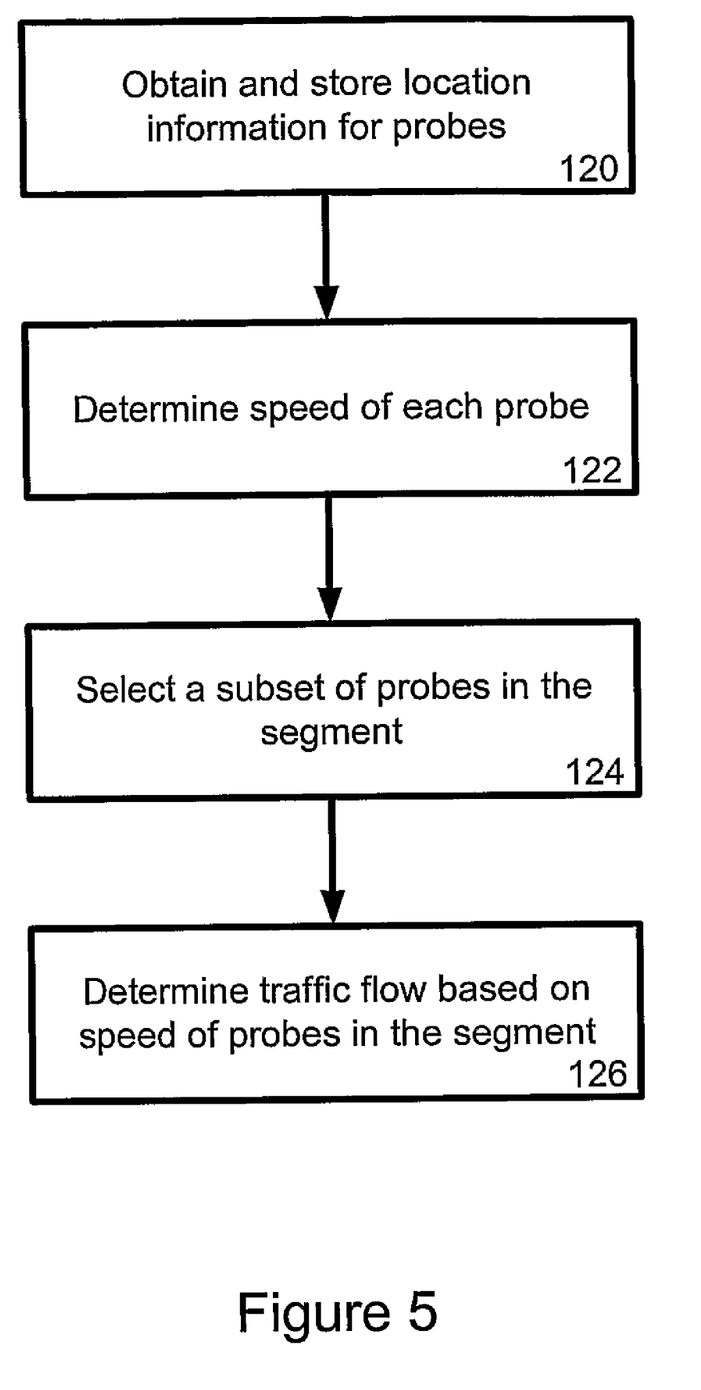
FIG. 5 is a flowchart illustrating a method of the present invention.

FIG. 5 illustrates a method of the present invention as described above. In step 120, location information for a plurality of probes is obtained and stored. In step 122, the speed of the probes is determined. This can be performed either through obtaining a velocity vector from the probe, or by a comparison of last known position to a new position. In step 124, a subset of probes is selected, so that all the selected probes are located inside the traffic route segment. In step 126, the traffic flow of the route segment is graded on the basis of the speed of the probes in the segment. As described above, probes can be filtered out of either the subset, or the complete pool based on speeds, locations and other characteristics determined by the system operator.

As a result of the testing, presently preferred embodiments of the system make use of more complex logic to determine the traffic flow of arterial roads than are necessary for determining the traffic flow of highways. The enhanced logic preferably handle vehicles as stopped at a traffic light according to operator preference, so that they can either be averaged over time, or can be shown as stopped.

The system of the present invention can be used in a number of environments at a reasonable cost. In addition to arterial roads and highways, the system can be applied to border crossings and bridges, so that traffic flow can be monitored and managed. The system can be implemented by a number of entities, and may be marketed to distinct markets including government transportation agencies, individual drivers (commuters, professionals, etc.), fleet operators, and traffic information providers.

The reporting of information can be done in a number of ways. Though described above with reference to mapping software, and an IVR interface, the generation of the location information can be leveraged over a number of interfaces. As described above, the location information is preferably stored as an XML file, that can then be accessed by any of a number of interfaces, including short message service (SMS) based interfaces, that can either interactively, or in a pre-programmed fashion, transmit updates to users via their cellular phones. IVR systems can provide traffic updates using either a DTMF or voice recognition engine to allow for hands free operation. Direct Audio Broadcasting (DAB) transmissions can also be used to provide the information to users, as can e-mail messages transmitted to Internet accessible devices. The multiple distribution platforms allows for advertising revenues (primarily in conjunction with a world wide web based mapping interface), and fee for service models, including a periodic flat fee or a pay for use implementation.

One skilled in the art will appreciate that the elements of the system of the present invention can be implemented using standard computing platforms. Though illustrated as logically separate elements, the databases illustrated in FIG. 1 can be co-located in the same system, as can the processing elements.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of determining the flow of traffic on a monitored route segment comprising:
   obtaining and storing location information for a plurality of assisted global positioning system enabled cellular traffic probes;
   determining the speed of each of the plurality of cellular traffic probes based only on the stored location including determining a distance traveled by each probe having a database entry with a most recent timestamp since a previous timestamp, and dividing the determined distance by the time between timestamps;
   selecting a subset of the plurality of cellular traffic probes corresponding to probes having a location in the monitored route segment; and
   determining the traffic flow for the monitored route segment on the basis of the determined speed of the probes in the selected subset.

2. The method of claim 1 wherein the step of determining the speed includes determining the speed of each of the plurality of probes based on the stored location and historical data.

3. The method of claim 1 wherein the step of obtaining includes requesting location information from a location based service platform.

4. The method of claim 3 wherein requesting location information includes transmitting a request over a virtual private network to a cellular carrier location based service platform.

5. The method of claim 1 wherein the step of storing the location information includes storing a probe identifier, a timestamp and a probe location in a database.

6. The method of claim 1 wherein the step of determining the speed includes obtaining a velocity vector from the location information.

7. The method claim 1 wherein the step of determining the speed includes determining a direction of travel for each probe having a database entry.

8. The method of claim 7 wherein the step of determining a direction includes comparing a most recently stored location to a previously stored location.

9. The method of claim 7 wherein the step of selecting a subset includes selecting all probe locations in a defined area having a defined determined direction of travel.

10. The method of claim 1 wherein the step of selecting a subset includes selecting all probe locations in a defined area.

11. The method of claim 1 wherein the step of determining the traffic flow includes grading the traffic flow in accordance with the speed of the selected subset of probes.

12. The method of claim 1 further including the step of filtering the selected subset to remove outlying probe values prior to the step of determining the traffic flow.

13. The method of claim 12 wherein the step of filtering includes determining a distribution of the probes in the subset, and removing from the subset any probe having speed more than two standard deviations from the normal of the distribution.

14. The method of claim 12 wherein the step of filtering includes determining an average speed of the probes in the subset, and removing from the subset any probe having a speed more than a predetermined amount away from the determined average speed.

15. A system for monitoring and determining the flow of traffic on a monitored route segment, the system comprising:

a location fetcher for obtaining and storing location information for a plurality of assisted global positioning system enabled cellular traffic probes;

a location processor for determining the speed of each of the plurality of cellular traffic probes based only on the stored location information by determining a distance traveled by each probe having a database entry with a most recent timestamp since a previous timestamp, and dividing the determined distance by the time between timestamps; and a mapping engine for selecting a subset of the plurality of cellular traffic probes corresponding to probes having a location in the monitored route segment and for determining a traffic flow rating on the basis of the determined speed of the probes in the selected subset.

16. The system of claim 15 wherein the location information includes position and velocity vectors.

17. The system of claim 15 wherein the location fetcher includes a location based service platform interface for connecting to a location based service platform to request and receive location information for the plurality of assisted global positioning system enabled cellular traffic probes.

18. The system of claim 15 wherein the mapping engine includes a filter for selecting a subset of the plurality of probes corresponding to probes having a location in the monitored route segment, a speed within a ranged determined in accordance with the speed of other probes in the subset, and a predetermined direction.

* * * * *